United States Patent
Wang et al.

(10) Patent No.: US 11,588,994 B2
(45) Date of Patent: Feb. 21, 2023

(54) IMAGE SENSOR WITH EMBEDDED NEURAL PROCESSING UNIT

(71) Applicant: SmartSens Technology (HK) Co., Ltd, Kwun Tong Kowloon (HK)

(72) Inventors: Xiaoyong Wang, Shanghai (CN); Jin He, Shanghai (CN)

(73) Assignee: SmartSens Technology (HK) Co., Ltd, Kowloon (CN)

(*) Notice: Subject to any disclaimer, the term of this patent is extended or adjusted under 35 U.S.C. 154(b) by 0 days.

(21) Appl. No.: 17/385,808

(22) Filed: Jul. 26, 2021

(65) Prior Publication Data

US 2023/0026814 A1 Jan. 26, 2023

(51) Int. Cl.
*H04N 5/3745* (2011.01)
*G06T 7/00* (2017.01)

(52) U.S. Cl.
CPC ......... *H04N 5/3745* (2013.01); *G06T 7/0002* (2013.01); *G06T 2207/20084* (2013.01)

(58) Field of Classification Search
CPC ............... H04N 5/3745; G06T 7/0002; G06T 2207/20084
See application file for complete search history.

(56) References Cited

U.S. PATENT DOCUMENTS

| | | | | |
|---|---|---|---|---|
| 10,943,442 | B1* | 3/2021 | Lemberger | H04M 11/10 |
| 11,412,555 | B2* | 8/2022 | Kim | H04N 5/23293 |
| 2016/0268325 | A1* | 9/2016 | Hsieh | H01L 27/14683 |
| 2021/0127090 | A1* | 4/2021 | Kale | H04N 5/247 |
| 2021/0390777 | A1* | 12/2021 | Lopez Mendez | G06T 19/006 |
| 2022/0027649 | A1* | 1/2022 | Lee | G06V 10/30 |

OTHER PUBLICATIONS

Author: Kyuseok Lee; Title: An Energy-Efficient CMOS Image Sensor with Embedded Machine Learning Algorithm, Dissertation; Date: 2019; University of Michigan.

* cited by examiner

*Primary Examiner* — Gevell V Selby
(74) *Attorney, Agent, or Firm* — Eric Karich; Karich & Associates

(57) ABSTRACT

An imaging system has a imaging array on a semiconductor chip which also includes circuit the elements NPU and SRAM to rapidly identify target objects in the imaging data and output their high level representations with low power consumption.

6 Claims, 4 Drawing Sheets

IMAGE SENSOR WITH EMBEDDED NEURAL PROCESSING UNIT

BACKGROUND OF THE INVENTION

Field of the Invention

This invention relates generally to image sensors, and more particularly to CMOS image sensor chips with embedded feature detection. The chip includes an array of light sensitive regions and structures to capture an image and also includes circuit elements to extract a pre-defined image component from the array to facilitate more rapid imaging of selected objects more rapidly and with lower power consumption. The image sensor may be incorporated within, for example, a digital camera.

Description of Related Art

An image capture device includes an image sensor and an imaging lens. The imaging lens focuses light onto the image sensor to form an image, and the image sensor converts the light into electrical signals. The electric signals are output from the image capture device to other components of a host electronic system. The image capture device and the other components of a host electronic system form an image sensor system or imaging system. Image sensors have become ubiquitous and may be found in a variety of electronic systems, for example a mobile device, a digital camera, a medical device, or a computer.

A typical image sensor comprises a number of light sensitive picture elements ("pixels") arranged in a two-dimensional array. Such an image sensor may be configured to produce a color image by forming a color filter array (CFA) over the pixels. The technology used to manufacture image sensors, and in particular, complementary metal-oxide-semiconductor ("CMOS") image sensors, has continued to advance at great pace. For example, the demands of higher resolution and lower power consumption have encouraged the further miniaturization and integration of these image sensors. However, miniaturization has come with the loss of pixel photosensitivity and dynamic range which require new approaches in order to mitigate.

It is known to form a given image sensor as a so-called stacked image sensor. In a typical arrangement of this type, photodiodes or other light sensitive elements of the pixel array are formed in a first semiconductor die or substrate, while associated readout circuitry for processing signals from the photosensitive elements is formed in a second semiconductor die or substrate that directly overlies the first semiconductor die or substrate. These first and second semiconductor die or substrates are more generally referred to herein as sensor and circuit chips, respectively. More precisely, the first and second semiconductor die are formed alongside many other like die on the first and second semiconductor wafers which are stacked, after aligning associated inter-wafer electrical interconnects, and diced or cut into a stacked assembly of commonly called semiconductor chips. When reference is made to stacking two chips it is understood that in one common practice two wafers are stacked and diced into chips that remain stacked to form an electrical system such as a stacked image sensor. It is however possible to stack individual chips taken from a first wafer on to other chips still in wafer form or even to stack two chips. Also the inter-wafer electrical interconnects coupling the sensor and circuit wafers may be referred to as inter-chip interconnects while intra-wafer interconnects and intra-chip interconnects refer to interconnections formed among devices residing on the same wafer and chip respectively. An advantage associated with this arrangement includes that the resulting image sensor system occupies a reduced area compared with not stacked arrangements. An additional advantage is that different manufacturing methods and materials may be used to fabricate each chip allowing independent optimizations to be employed.

Real-time image processing is difficult to achieve. This is due to several factors, such as the large data set represented by an image, and the complex operations which may need to be performed on the image. At real-time video rates of 30 frames per second, a single operation performed on every pixel of a color image can equate to tens of millions of operations per second. Many image processing applications require that several operations be performed on each pixel in the image resulting in an even larger number of required operations per second.

Typically, an image signal processor (ISP) is implemented within the imaging system for this purpose. It provides demoaicing to determine which color each pixel represents and to interpolate regions at and near pixels. It also may control autofocus, exposure, and white balance for the imaging system. Recently correcting for lens imperfections like vignetting or color shading imparted by the imperfect lens system has been added, along with things like HDR recombining, noise reduction, other filtering, face or object detection. It may also provide focus assembly control if needed. The ISP may be included onboard the circuit wafer or as an added discrete chip. ISPs typically have an embedded Central Processing Unit (CPU) to execute its required functions. CPUs are general purpose and generally contribute to excess power consumption. All together they have little or no reconfigurability and often must be redesigned and manufactured for each application change.

Feature detection is a long-standing problem in computer vision. Generally speaking, it mainly includes edge detection, corner detection, blob detection and so on. Traditional leading methods mainly focus on the utilization of local cues, such as brightness, colors, gradients and textures. However, what is needed is a higher-level of abstraction, that is, to focus on detecting central points where there are say pedestrians, vehicles, and cyclists for which modern deep models are already capable.

In machine learning, a classifier assigns a class label to a data point. For example, an image classifier produces a class label (e.g., bird, plane) for what objects exist within an image. A convolutional neural network, or CNN for short, is a type of classifier, which excels at solving this problem. A CNN is a neural network: an algorithm used to recognize patterns in data. Neural Networks in general are composed of a collection of neurons that are organized in layers, each with their own learnable weights and biases. A CNN has the basic building blocks of tensor, neuron, and layer.

A tensor can be thought of as an n-dimensional matrix. A neuron can be thought of as a function that takes in multiple inputs and yields a single output. A layer is simply a collection of neurons with the same operation, including the same hyper parameters. The layers are arranged in such a way so that they detect simpler patterns first (lines, curves, etc.) and more complex patterns (faces, objects, etc.) further along. Kernel weights and biases, while unique to each neuron, are tuned during a training phase, and allow the classifier to adapt to the problem and dataset provided. A CNN conveys a differentiable score function, which is represented as class scores in the visualization on the output layer. CNNs utilize a special type of layer, aptly named a convolutional layer, that makes them well-positioned to learn from image and image-like data so CNNs can be used for many different computer vision tasks, such as image processing, classification, segmentation, and object detection.

One alternative when an image sensor is employed in the field of machine learning or artificial intelligence where specific objects need to be recognized and output rapidly is to use a Neural Processing Unit (NPU) along with the ISP. The NPU is capable of much higher parallel computation via matrix processing and can be programmed to use classifiers such as CNN to recognize objects based on their outline or other features and then to output only the higher level image information rather than all the individual pixel data.

An opportunity for the improvement of imaging speed at reduced power consumption presents itself with the incorporation of CNNs and an NPU within the imaging system.

An additional opportunity for improvement of image sensor system size that includes stacked image sensors in which the sensor and circuit chips are stacked and interconnected and on which circuit chip an NPU is included.

The present invention fulfills these needs and provides further advantages as described in the following summary. Other features and advantages of the present invention will become apparent from the following more detailed description, taken in conjunction with the accompanying drawings, which illustrate, by way of example, the principles of the invention.

SUMMARY OF THE INVENTION

The present invention teaches certain benefits in construction and use which give rise to the objectives described below.

An image sensor has among its components a pixel cell that has a photodiode, a transfer transistor, a source follower amplifier transistor, and a readout circuit. The photodiode, transfer transistor, source follower amplifier transistor and reset transistor are disposed within a semiconductor chip for accumulating an image charge in response to light incident upon the photodiode. Also disposed within the chip there may also be certain other circuits useful in image processing such as I/O, PLL and ISP circuit blocks. The inventive feature of the claimed device comprises the additional incorporation within the chip of a Neural Processor Unit (NPU) and SRAM memory to be used to facilitate artificial intelligence (AI) related imaging tasks.

A primary objective of the present invention is to provide an image sensor with on chip NPU having advantages not taught by the prior art.

Another objective is to provide an image sensor with an image sensor that operates at reduced power and increased speed when compared to other imaging solutions used for AI related imaging tasks.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an image sensor system on a semiconductor chip including an embedded Neural Processing Unit (NPU). In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects. A substrate may have a front side and a back side. Any fabrication process that is performed from the front side may be referred to as a frontside process while any fabrication process that is performed from the back side may be referred to as a backside process. Structures and devices such as photodiodes and associated transistors may be formed in a front surface of a substrate. A dielectric stack that includes alternating layers of metal routing layers and conductive via layers may be formed on the front surface of a substrate.

The terms "coupled" and "connected," which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor). In the present invention of a stacked chip arrangement the front sides of two chips may be directly connected since the electrical interconnects on each chip will most commonly be formed on the front sides of each chip. When reference is made to certain circuit elements residing within or formed in a substrate this is generally accepted to mean the circuits reside on the front side of the substrate.

Figure 1:
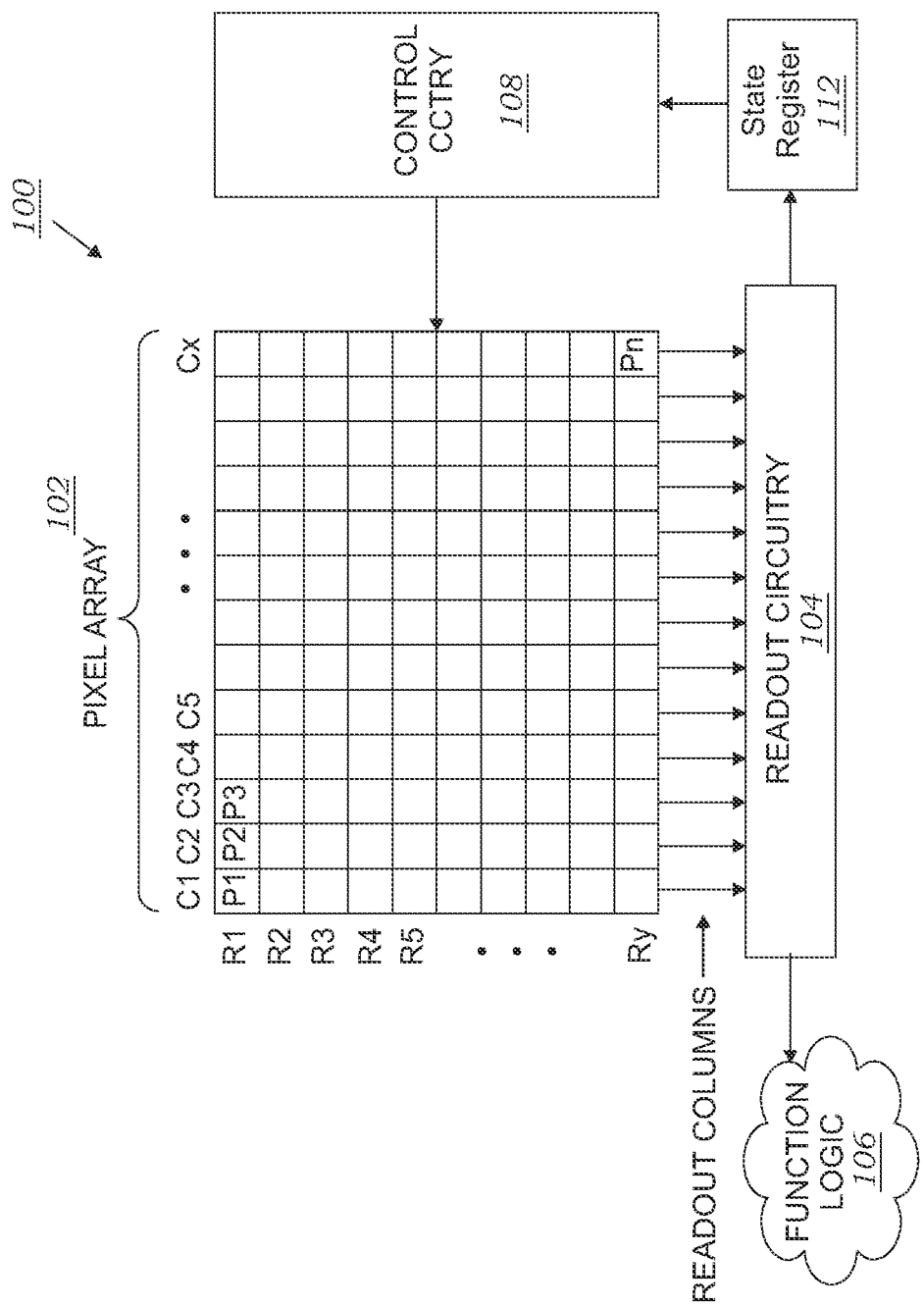
FIG. 1 is a diagram illustrating one example of an imaging system which is part of an integrated circuit system according to one embodiment of the present invention.

FIG. 1 is a diagram illustrating one example of an imaging system 100 including an example pixel array 102 having a plurality of image sensor pixels included in an example integrated circuit system with features in accordance with the teachings of the present invention. As shown in the depicted example, imaging system 100 includes pixel array 102 coupled to control circuitry 108 and readout circuitry 104, which is coupled to function logic 106. Control circuitry 108 and readout circuitry 104 are in addition coupled to state register 110. In one example, pixel array 102 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. In one example, after each pixel has acquired its image data or image charge, the image data is readout by readout circuitry 104 using a readout mode specified by state register 110 and then transferred to function logic 106. In various examples, readout circuitry 104 may include amplification circuitry, analog-to-digital (ADC) conversion circuitry, or otherwise. State register 110 may include a digitally programmed selection system to determine whether readout mode is by rolling shutter or global shutter. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated) or may readout the image data using a variety of other techniques (not illustrated), such as a serial readout or a full parallel readout of all pixels simultaneously. In one example, control circuitry 108 is coupled to pixel array 102 to control operational characteristics of pixel array 102. Some aspects of the operation of control circuitry 108 may be determined by settings present in state register 110. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
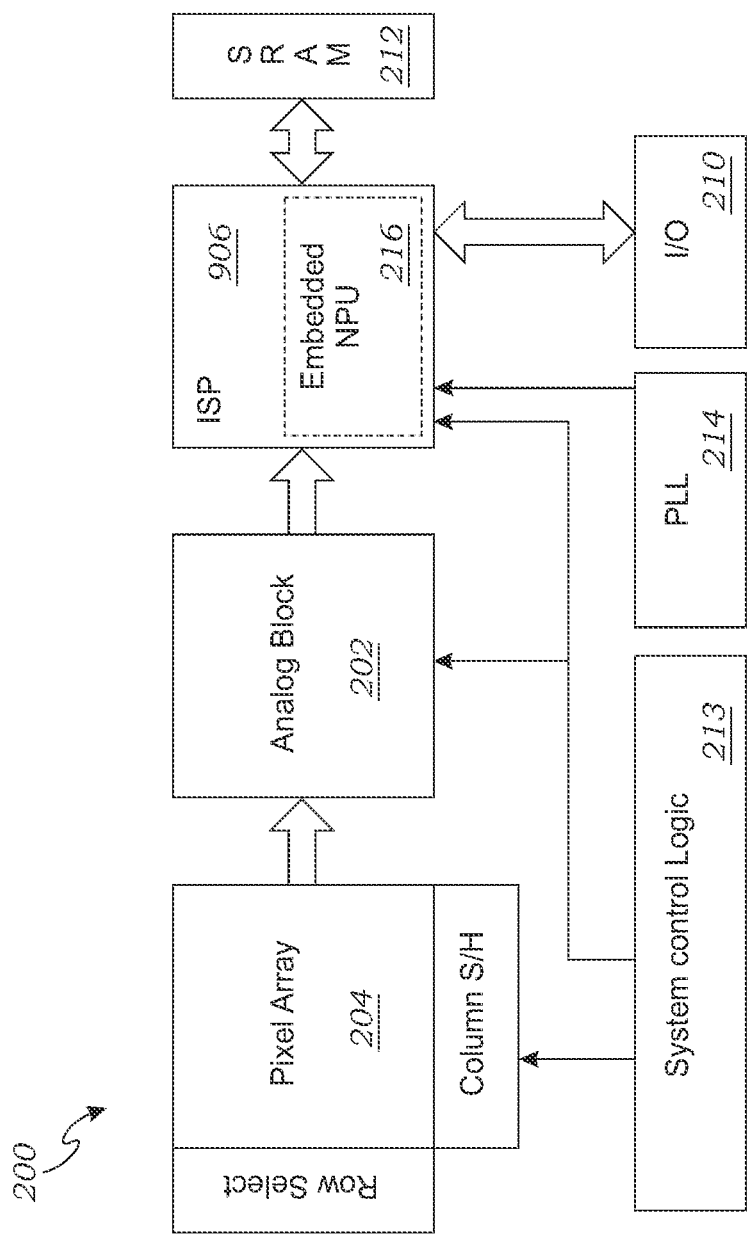
FIG. 2 is a diagram of an imaging system with integrated components in accordance with an embodiment of the invention.

FIG. 2 is a diagram of an imaging system on a semiconductor chip with an arrangement of integrated components in accordance with a first embodiment of the invention The diagram shows a more complete imaging system 200 than is shown in FIG. 1 where mostly the circuits immediate to the pixel array are shown. FIG. 2 shows an analog block 202 which converts the analog signals from pixel array 204 into digital signals useful for ISP 206 to convert into images which are transmitted to other device components through I/O block 210. Every mobile device with a camera today has an ISP taking the raw photonic data gathered up by an image sensor and turning it into something that can be usefully displayed on the device, or encoded into a familiar format for sharing, or in the case of the invention be sent to a computer vision subsystem, SRAM memory circuit 212 stores the digital image data for further processing. Embedded NPU 216 can recognize objects in the digital image data with the help of previously loaded image pattern information stored in SRAM 212. System control logic block 212 provides signals required within several other blocks including the pixel array, analog block and ISP. The Phase Locked Loop (PLL) 214 provides synchronization of signals. ISP 206 includes the ability to perform the multiplicity of steps involved in capturing a single image such as de-noising, dead pixel correction, de-mosaicing, scaling, tone mapping, white balance, color space conversion, gamma correction, sharpening, and then provide data suitable for the NPU to perform the tasks it is designed and programmed to complete. I/O 210 may be an I2C interface or many others.

The present invention is an Artificial Intelligence (AI) imaging system on a semiconductor chip because it includes within it, besides an image sensor and all the circuits needed to operate it, and SRAM and an NPU where the SRAM provides the instructions and reference data that allows the NPU to output semantic information associated with those instructions and reference data. The semantic information is high level and feature based information condensing an image such as a gesture by a hand or a pedestrian on a street into smaller data sets that can be output rapidly and with reduced power consumption. Other AI imaging tasks include face detection and gaze detection. Other AI imaging tasks include detecting objects on the road, such as pedestrians, vehicles, cyclists, lane markers and traffic signs. Another application would be to detect a hand gesture for start or stop that could be used in place of a remote control for a television or an air conditioner. Two hands held in the form of an "S" might be used and recognized for START while two hands held in the form of a "T" might be used and recognized for STOP.

Figure 3:
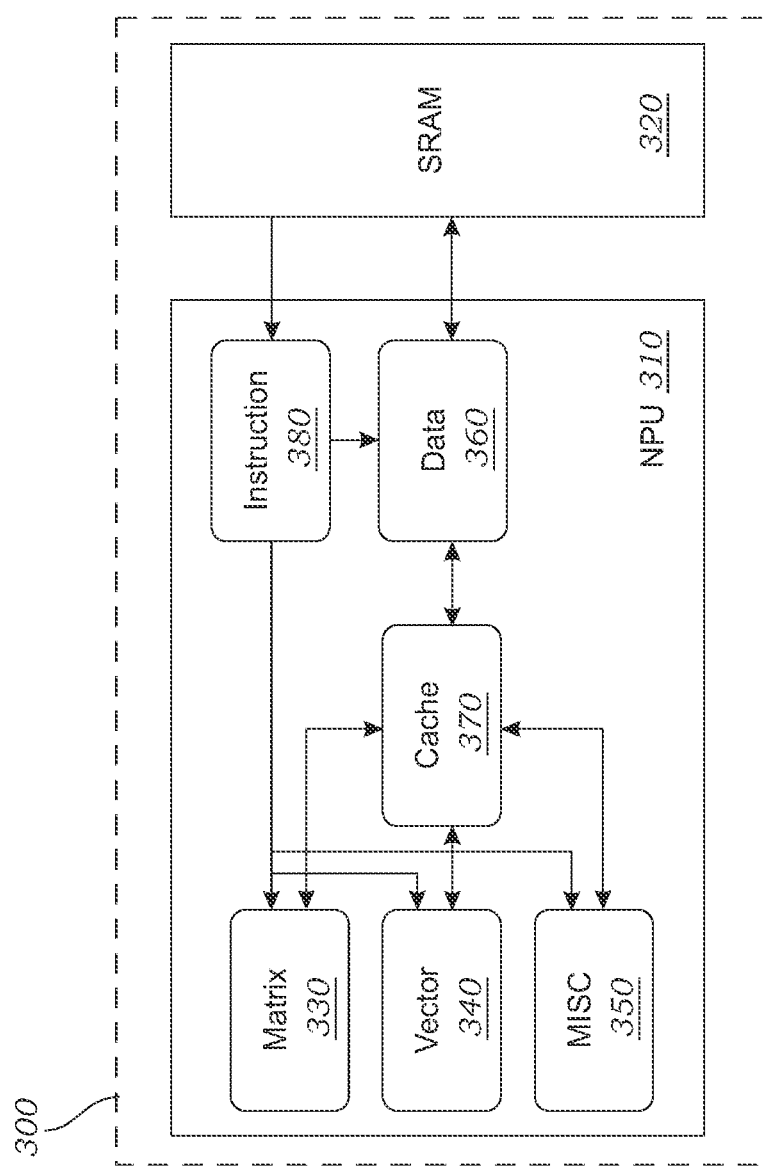
FIG. 3 is a diagram of an imaging system circuit chip component of a stacked chip arrangement showing integrated components in accordance with a second embodiment of the invention.

FIG. 3 is a diagram showing some of the components that might populate a circuit chip or wafer element 300 of a stacked chip arrangement of an imaging system in accordance with a second embodiment of the invention. On board circuit chip or wafer 300 is found NPU module 310 and SRAM 320. NPU module 310 may consist in part of MATRIX module 330 which is useful to apply matrix convolution operations and Vector module 340 which is useful to execute vector multiplication or addition operations. Also there may be included module MISC 350 which may include general functions such as depth-wise convolution, pooling, element-wise processing and the like for Artificial Intelligence (AI) programs. Also included may be data transfer module DATA 360 which is useful to load data from SRAM 320 to NPU 310 or to save data from NPU 310 to SRAM 320. Module CACHE 370 may be useful for internal buffering to decrease latency. Module INSTRUCTION 380 may also be included which may be useful to allocate related to the proper execution of the order of module function execution.

Figure 4:
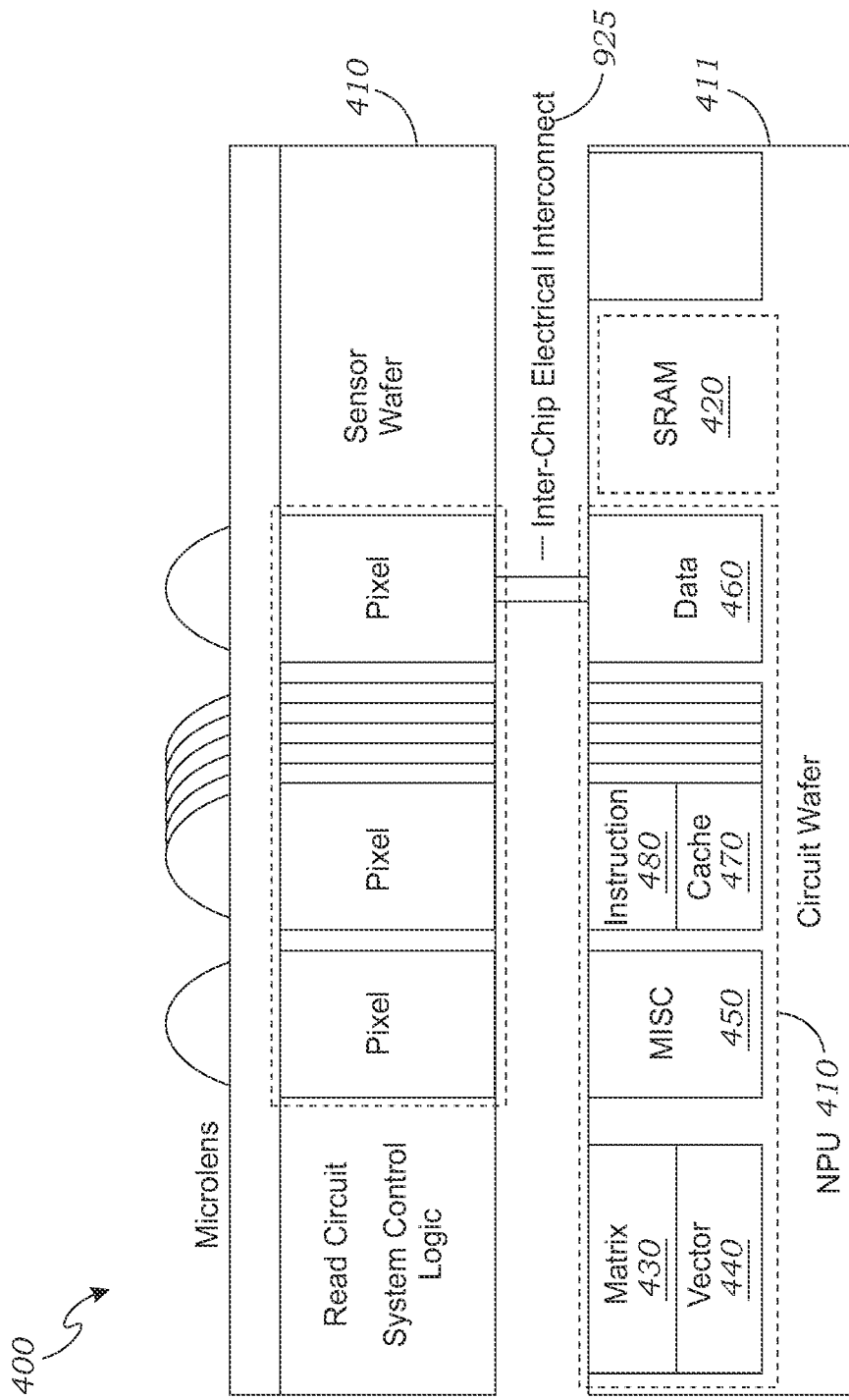
FIG. 4 is a cross section diagram of an imaging system in a stacked chip arrangement with integrated components in accordance with a second embodiment of the invention.

FIG. 4 is a cross section diagram of an imaging system 400 in a stacked chip arrangement with integrated components in accordance with a second embodiment of the invention. Sensor wafer 410 is arranged in a stack arrangement with circuit wafer 411. Sensor wafer 410 may have imaging pixels with their associated microlenses and imaging pixel read circuits and the system control logic to accomplish the readouts. Circuit wafer 411 contains in part the elements shown in FIG. 3 including MATRIX 430, VECTOR 340, MISC 350, DATA 360, CACHE 370, INSTRUCTION 380 and SRAM 320.

In one or more embodiments of the invention the NPU core has 256 MAC/cycle running at 300 MHz. Computational power is about 0.3 Tops. MAC/cycle measures the number of times a processing unit can add the product of two numbers to an accumulator per clock cycle. MAC units are typically used for digital signal processing. Tera Operations Per Second (TOPS) is a common performance metric used for high-performance SoCs. In this embodiment there is also included a 32 bit micro-controller and an SRAM of 4 Mbytes and the ISP includes as mentioned above the various functions for image processing including AEC/AWB/DPC/CIP/Scaling/Gamma/CCM.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top," "down," "above," and "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An Artificial Intelligence image sensor, comprising:
   an image sensor array and control circuits for acquiring an imaging signal;
   an image processing and logic circuit connected to the image sensor array;
   a Neural Processing Unit and a Static Random Access Memory, wherein the Static Random Access Memory stores instructions and reference data to enable the Neural Processing Unit to identify target objects in the imaging data and output their high level representations rapidly with low power consumption; and
   wherein the Neural Processing Unit has 256 MAC/cycle running at 300 MHz and computational power is about 0.3 Tops and wherein is also included a 32 bit microcontroller and a Static Random Access Memory of 4 Mbytes.

2. An Artificial Intelligence image sensor, comprising:
   an image sensor array and control circuits for acquiring an imaging signal;
   an image processing and logic circuit connected to the image sensor array;
   a Neural Processing Unit with convolutional neural network algorithm to recognize patterns in data; and
   a Static Random Access Memory wherein the Memory stores instructions and reference data to enable the Neural Processing Unit to identify target objects in the imaging data and output their high level representations rapidly with low power consumption.

3. An Artificial Intelligence image sensor, comprising:
   an image sensor array and control circuits for acquiring an imaging signal;
   an image processing and logic circuit connected to the image sensor array;
   a Neural Processing Unit comprising:
   a MATRIX module to apply matrix convolution operations;
   a DATA module to load data from the Static Random Access Memory to the Neural Processing Unit or to save data from the Neural Processing Unit to the Static Random Access Memory;
   a CACHE Module for internal buffering to decrease latency; and
   an INSTRUCTION Module for the proper execution of the order of module function execution; and
   wherein the Memory stores instructions and reference data to enable the Neural Processing Unit to identify target objects in the imaging data and output their high level representations rapidly with low power consumption.

4. The Artificial Intelligence image sensor of claim 3, the Neural Processing Unit further comprising:
   a MATRIX module which is useful to apply matrix convolution operations; and
   a vector module which is useful to execute vector multiplication or addition operations.

5. An imaging sensor, comprising:
   a first substrate having a first surface and a second surface;
   the first substrate comprising an image sensor chip for acquiring an imaging signal;
   a circuit chip stacked upon the first surface of the first substrate for coupling out the image signal through the circuit chip;
   an inter-chip electrical interconnect which directly couples the image sensor chip to the circuit chip;
   a Neural Processing Unit and a Static Random Access Memory disposed within the circuit chip, wherein the Memory stores instructions and reference data to enable the Neural Processing Unit to identify target objects in the imaging data and output their high level representations rapidly with low power consumption;
   an image sensor array and control circuits for acquiring an imaging signal;
   an image processing and logic circuit connected to the image sensor array; and
   a Neural Processing Unit and a Static Random Access Memory wherein the Memory stores instructions and reference data to enable the Neural Processing Unit to identify target objects in the imaging data and output their high level representations rapidly with low power consumption.

6. The Artificial Intelligence image sensor of claim 5, the Neural Processing Unit further comprising:
   a MATRIX module which is useful to apply matrix convolution operations; and
   a vector module which is useful to execute vector multiplication or addition operations.

* * * * *